United States Patent [19]

Tamura

[11] Patent Number: 5,609,953
[45] Date of Patent: Mar. 11, 1997

[54] PLASTIC MOLDED ARTICLES HAVING RESIN FIBERS DISPERSED THEREIN

[75] Inventor: Masanobu Tamura, Yokohama, Japan

[73] Assignee: Nippon Planning Co., Ltd., Kanagawa-ken, Japan

[21] Appl. No.: 253,033

[22] Filed: Jun. 2, 1994

[51] Int. Cl.$^6$ .............................. B29C 44/06; B29C 44/12
[52] U.S. Cl. .................................... 428/316.6; 428/317.9; 428/407; 428/522; 264/55; 264/45.3; 264/46.9; 264/278
[58] Field of Search .............................. 428/316.6, 317.9, 428/522, 407; 264/46.9, 45.3, 278, 55; 273/58 A, 58 J, DIG. 7, DIG. 22

[56] References Cited

U.S. PATENT DOCUMENTS

| | | | |
|---|---|---|---|
| 2,989,782 | 6/1961 | Barkhuff, Jr. et al. | 273/58 J |
| 3,079,644 | 3/1963 | Molitor et al. | 273/58 J |
| 3,286,004 | 11/1966 | Hill et al. | 264/45.3 |
| 3,382,302 | 5/1968 | Marzocchi | 264/45.3 |
| 3,391,823 | 7/1968 | Tijms | 264/45.3 |
| 3,940,145 | 2/1976 | Gentiluomo | 273/DIG. 22 |
| 3,976,295 | 8/1976 | Heald, Jr. . | |
| 4,142,720 | 3/1979 | Davis | 273/DIG. 7 |
| 4,159,294 | 6/1979 | Oishi et al. | 264/45.3 |
| 4,211,407 | 7/1980 | Tomar . | |
| 4,364,565 | 12/1982 | Tomar . | |
| 4,436,276 | 3/1984 | Donahue | 264/278 |
| 4,463,951 | 8/1984 | Kumasaka et al. | 273/58 A |
| 4,529,200 | 7/1985 | Miller et al. . | |
| 4,572,507 | 2/1986 | Hubbert et al. . | |
| 4,610,071 | 9/1986 | Miller . | |
| 4,660,830 | 4/1987 | Tomar . | |
| 4,674,170 | 6/1987 | Hubbert et al. . | |
| 4,725,058 | 2/1988 | Molitor . | |
| 4,840,378 | 6/1989 | Molitor . | |
| 5,122,046 | 6/1992 | Lavallee et al. | 264/278 |
| 5,123,659 | 6/1992 | Williams | 264/46.9 |
| 5,314,187 | 5/1994 | Proudfit | 273/DIG. 22 |

FOREIGN PATENT DOCUMENTS

| | | | |
|---|---|---|---|
| 2024033 | 8/1970 | France | 264/45.3 |
| 2124627 | 11/1972 | Germany | 428/316.6 |
| 49-341 | 1/1974 | Japan | 264/45.3 |
| 50-85672 | 7/1975 | Japan | 264/45.3 |
| 24328 | 3/1976 | Japan . | |
| 58-10069 | 1/1983 | Japan . | |
| 58-76226 | 5/1983 | Japan | 264/45.3 |
| 58-36987 | 8/1983 | Japan . | |
| 60-235850 | 11/1985 | Japan | 264/45.3 |

*Primary Examiner*—Allan R. Kuhns
*Attorney, Agent, or Firm*—Lowe, Price, LeBlanc & Becker

[57] ABSTRACT

A method of forming a plastic molded article includes expansion molding of a plastic raw material mixed with a blowing material. In a first step, a first-stage expansion molding is used to form a core. This is followed by a second step in which a second-stage expansion molding is employed to produce an outer layer around the previously-formed core, in such a manner that the outer layer is fusion bonded and integrated with a boundary region of the core, thereby forming a second-stage molded product. At least the outer layer contains randomly distributed resin fibers.

19 Claims, 5 Drawing Sheets

PLASTIC MOLDED ARTICLES HAVING RESIN FIBERS DISPERSED THEREIN

BACKGROUND OF THE INVENTION

1. Field of the Invention

This invention relates to a method of forming plastic molded articles by admixing a blowing material in a plastic raw material and conducting expansion molding, and plastic molded articles formed thereby, and more particularly to a method of forming plastic mold articles which are suitable for obtaining spherical forms, such as baseballs, softballs, golf balls.

2. Background of the Related Art

In molding spherical forms from a synthetic resin (hereinafter referred to as "plastic" or "resin") as a raw material, unevenness of internal temperature distribution inevitably occurs to the spherical forms when they are cooled, irrespective of whether molding is effected by injection or any other molding method, since a spherical form is small in its surface area and thick diametrically. Therefore, it has been very difficult to uniformly obtain a spherical product having an accurate shape. To eliminate this inconvenience, there is known a technique which uses a plastic raw material together with a blowing material, thereby blowing a gas into the resin, for preventing what is called "the phenomenon of sink marks" from occurring during molding. However, even by this expansion molding method, it has been difficult to mold homogeneously-blown spherical forms due to unevenness of temperature distribution in a molten plastic raw material supplied to the inside of a mold. More specifically, the blown state of the resin varies within the mold such that the resin becomes less dense from the outer part toward the central part within the mold. In an extreme case, there is formed a cavity or large hollow space therein, causing a difficulty in molding a spherical form in a uniformly-blown state. If such an unevenly blown or expanded spherical form, e.g. a ball for a ball game, is made in spite of such a difficulty, the ball undergoes unstable movement while flying, which makes it impossible to use the ball for the ball game.

Further, it is a common knowledge that any thread-wound spherical form such as baseballs, softballs, golf balls, and the like should be high in density in their central portions. However, if such articles are molded from a plastic raw material, there is inevitably formed a vacuum foam in the central portion thereof due to the relationship between the cooling of the resin and thermal insulation of the raw material, which makes the density of the central portion markedly lower than that of the outer portion thereof. To eliminate such a drawback, a composite molding technique called "insert molding" has been proposed, in which a core is inserted or placed within a mold before molding a spherical form. Even the insert molding, however, suffers from the following problems: For holding the core within the mold, hold pins are used. It is normally impossible for the hold pins to withstand pressure applied in molding, unless they are thick enough to have a diameter of approximately 6 mm. Accordingly, it is required to use such thick hold pins, which results in holes formed within the molded article by the holding pins for holding the core, and when the hold pins are extracted therefrom, there are vacant portions left in the molded article. If the molded article is spherical, the vacant portions delicately put the gravitational force exerted on the article out of balance, so that if the central portion thereof is formed in an unbalanced state, there is an inevitable inconvenience that the spherical form undergoes unstable movements when flying at a high speed.

Further, there are the following general problems with plastic articles formed by molding: plastic materials mixed with glass fibers for enhancing the strength of molded articles have conventionally been used as reinforcing materials for use in parts of automotive vehicles, motorboats, and the like, and expanded plastic obtained by mixing blowing materials with plastic raw materials are used in other fields related to housings and daily commodities, such as beddings, cushions, imitation leathers, and insulators. However, in the case of the former, i.e., the plastic materials mixed with glass fibers, the hardness of the molded articles is increased while causing roughness of the surface thereof. Moreover, if the fibers become short due to kneading of resin materials by screws, the intended object cannot be attained, making it impossible to obtain soft molded articles. On the other hand, however hard a material is in itself, if it is molded into an expanded material by blowing a gas therein, the resin per se tends to become filament-like to lose its strength. Therefore, the latter, i.e. the expanded articles have been generally considered to be low in tearing strength up to now.

SUMMARY OF THE INVENTION

In the preferred embodiment, the present invention relates to a plastic molded article containing fibers. The plastic molded article formed by expansion molding of a plastic raw material uniformly mixed with a blowing material, wherein said plastic molded article is formed by a two-stage expansion molding process comprising the steps of: first-stage expansion molding of the uniformly mixed raw and blowing materials to form a core; a second-stage expansion molding of a mixture of resin fibers dispersed randomly in said plastic raw material to produce an outer layer around said core whereby the outer layer is fusion bonded and integrated into one piece with a boundary region of said core, thereby forming a second-stage molded product.

In another aspect of this invention, a plastic molded article formed by expansion molding of a plastic raw material mixed uniformly with a blowing material, wherein said plastic molded article has resin fibers randomly pre-mixed and dispersed therein, before conducting said expansion molding, to thereby cause said resin fibers to be uniformly distributed throughout said plastic molded article when said expansion molding is completed.

The above and other objects, features, and advantages of the invention will become more apparent from the following detailed description taken in conjunction with the accompanying drawings showing preferred embodiments thereof. Further, it should be understood that the present embodiments are illustrative and not restrictive and the invention is not to be limited to the details given herein, but may be modified within the scope of the appended claims.

DETAILED DESCRIPTION OF THE PREFERRED EMBODIMENTS

FIRST EMBODIMENT

Figure 1:
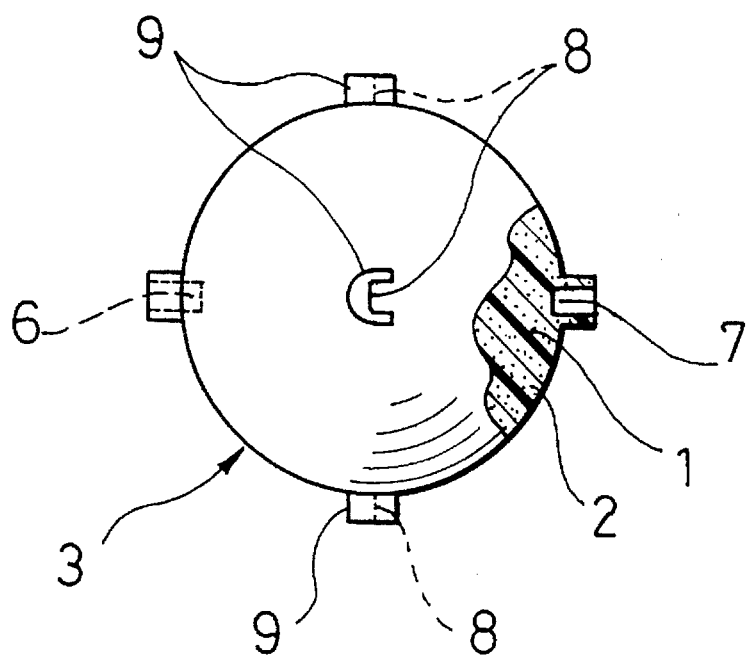
FIG. 1 is a side view of a first-stage molded product obtained by first-stage expansion molding.
Figure 2:
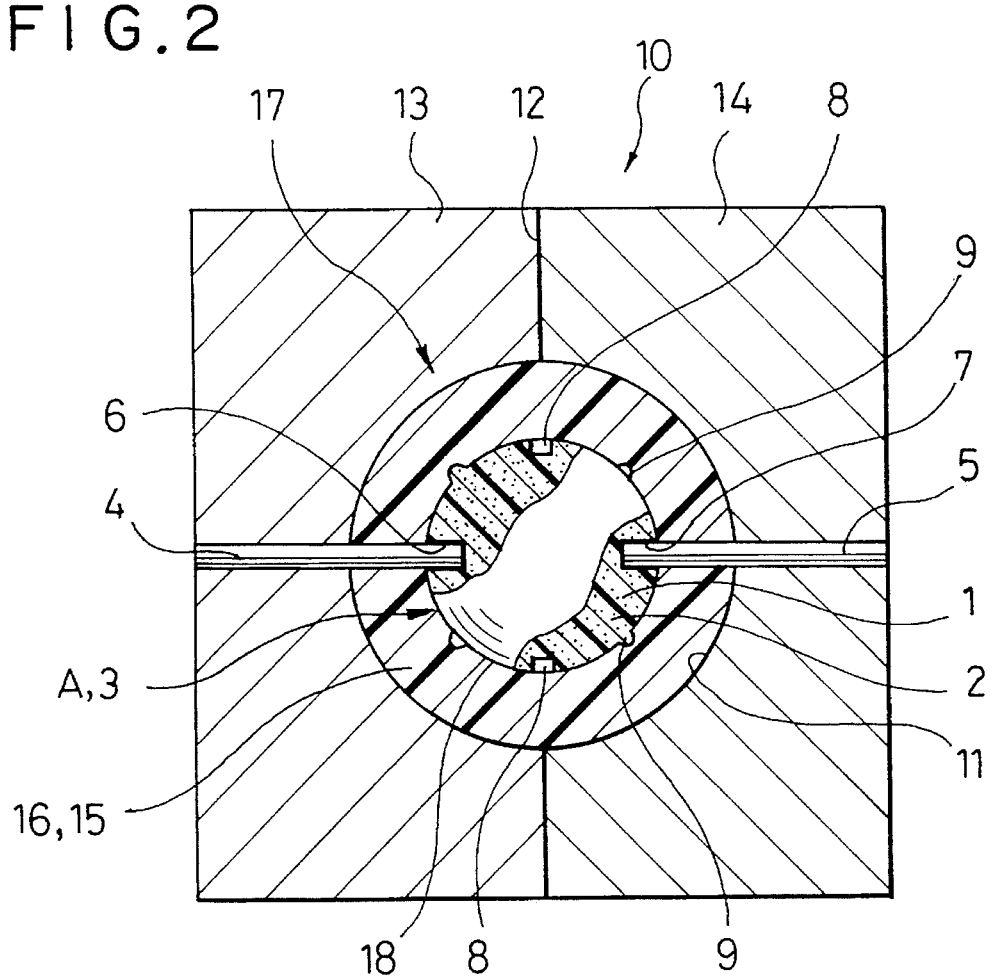
FIG. 2 is a cross-sectional view of a second-stage mold and an expanded article in a spherical form set therein, with a core inserted within the expanded article being shown in outline.
Figure 3:
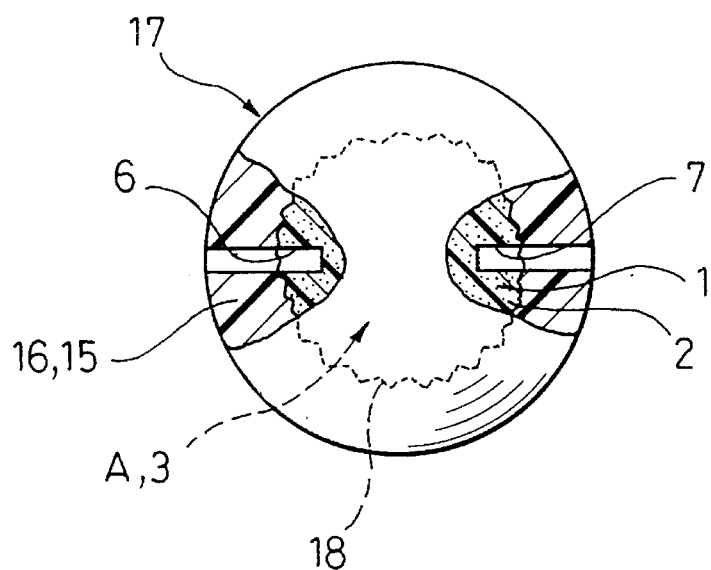
FIG. 3 is a side view, partly broken away, of a plastic molded article (second-stage molded product) removed from the second-stage mold in its internal fusion bonded state.
Figure 4:
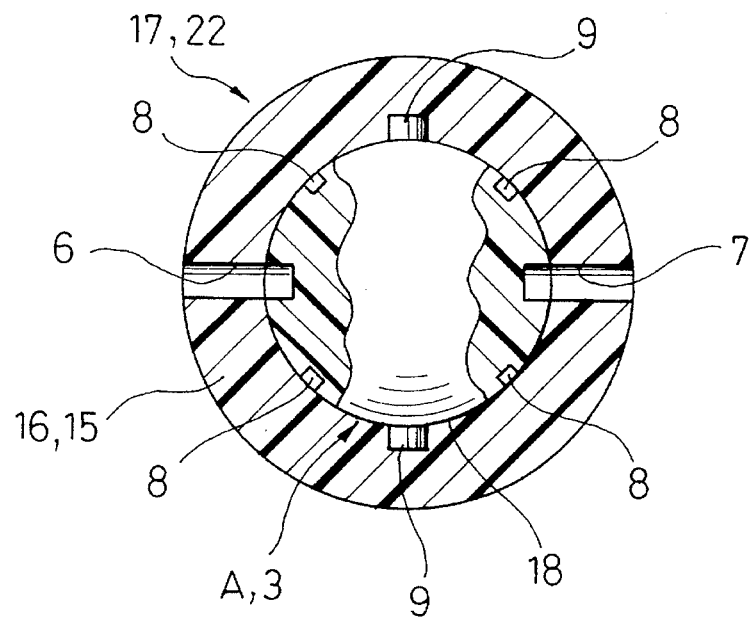
FIG. 4 is a schematic cross-sectional view of a plastic molded article as a spherical form molded by second-stage molding, with a core inserted in the spherical form being shown in outline.
Figure 5:
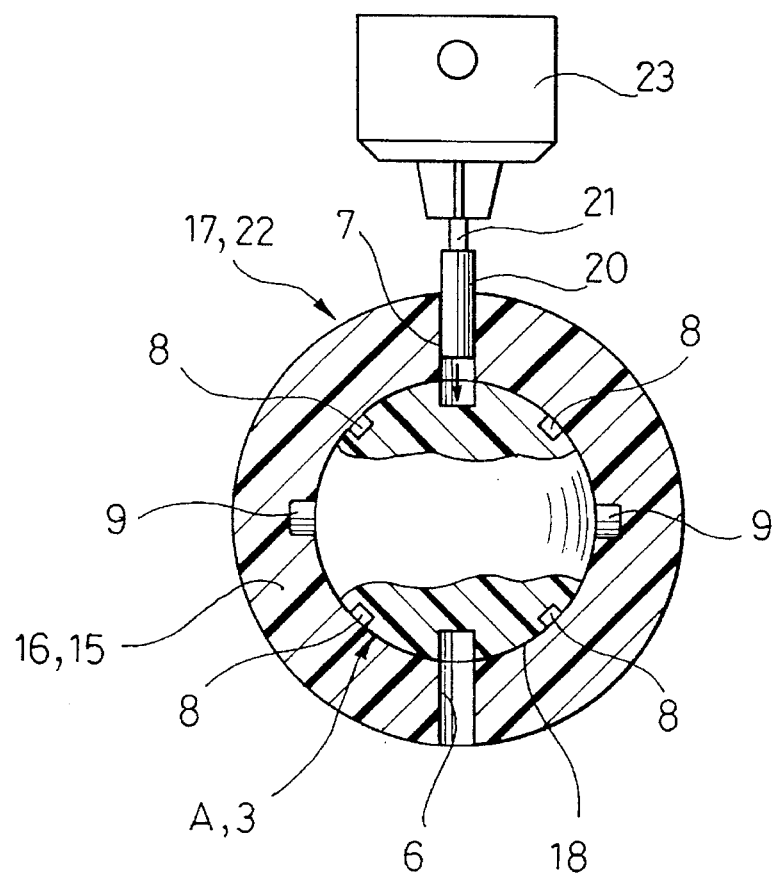
FIG. 5 is a schematic side view of the plastic molded article shown in FIG. 4, in a state where a pin held by a chuck is force-fit and pressure-welded into a hold pin-engaging hole remaining in the spherical form to fill up the hole.
Figure 6:
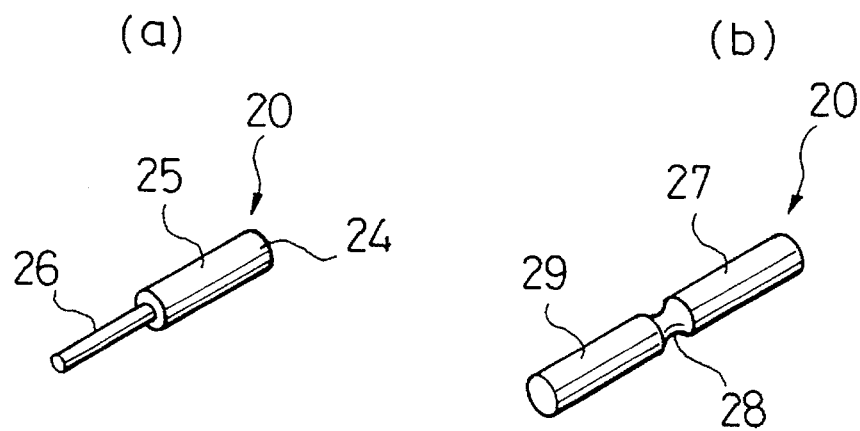
FIG. 6a and FIG. 6b are perspective views of a pin used in filling up holes formed in the spherical form.

Referring to FIG. 1 to FIG. 3, there will be described a first embodiment of the invention.

A first-stage mold, not shown, is packed with a raw material prepared by mixing a plastic raw material 1 and a blowing material 2, and first-stage expansion molding is conducted, to obtain a first-stage molded product in the form of a sphere.

The first-stage molded product 3 is formed with a hole 6 for engaging a movable hold pin 4, a hole 7 for engaging a fixed hold pin 5, balancing recesses 8, and balancing projections 9.

Then, the resulting molded product 3 is inserted or placed as a core A in a second-stage mold 10, and then placed and held in a central position of a cavity 11 within the second-stage mold 10 by means of the movable hold pin 4 and the fixed hold pin 5. In this connection, in the case of an illustrated example, the plastic molded article is formed as a spherical form, and the second-stage mold 10 employed is a split-in-two type which defines the cavity 11 suitable for the size and shape of the spherical form. More specifically, the mold 10 is formed by assembling a left half split 13 and a right half split 14 as viewed from FIG. 2, with a split surface 12 as a border between them. However, it goes without saying that the second-stage mold 10 is not limited to this type, but any other type can be freely employed, so long as it meets the size and shape of a plastic article to be molded according to the present embodiment.

In the present embodiment, when the second-stage mold 10 formed of the left and right splits 13, 14 is closed, the movable hold pin 4 and the fixed hold pin 5 are caused to get into a pair of engaging holes 6 and 7, respectively, whereby the first-stage molded product 3 is stably held in the central position of the second-stage mold 10 as the core A. The cavity 11 defined within the second-stage mold 10 is filled with a plastic raw material 15, and then expansion molding is performed to form an outer layer 16 around the core A, such that the core A and the outer layer 16 are integrated into one piece. After a sufficient time period for cooling has elapsed, the spherical form or ball in which the core A and the outer layer 16 have been integrated into one piece is removed from the second-stage mold 10 as the second-stage molded product 17.

As described above, according to the present embodiment, the plastic molded article 17 is formed through the two-stage process in which expansion molding and post-forming expansion molding are combined. Before performing the expansion molding, the blowing material 2 is mixed with the plastic raw material 1 in such a large amount that the blowing material cannot be used up for blowing in the first-stage expansion molding, so that the blowing material 2 is not completely gasified in the first-stage expansion molding to leave some amount thereof remaining unused within the core A. Accordingly, the blowing material remaining in the core A performs blowing by heat from the second-stage molding, whereby the first-stage molded product 3 (core A) and the outer layer 16 are well fusion bonded at their boundary region 18 to be molded into a spherical form integrated to such an extent as will make the boundary region unrecognizable, which is then removed from the second-stage mold 10.

During the second-stage molding, the plastic raw material 15 is supplied to the cavity 11 under a certain level of pressure. However, balancing recesses and projections 8 and 9 provided on the first-stage molded product 3 serve to prevent the first-stage molded product 3 from being displaced as the core A from its predetermined position within the second-stage mold 10, and further from being made eccentric both in weight and in the central position of the second-stage molded product 17 until it is completely cooled off.

According to this embodiment, the core A, which is molded in advance, is inserted in the second-stage molded product 17, so that the second-stage molded product 17 can be molded more easily by a degree proportional to an amount of reduction of weight and thickness of material for the second-stage molding, which enables the present molded product 17 to be formed by a small machine. The blowing material remaining unused in the first-stage molded product performs blowing (second-stage blowing or expansion) by heat during the second-stage molding to cause resins in the boundary region 18 of the core A and the outer layer 16 to be well fusion bonded. Further, the molding cycle can be shortened. In addition, variations of sizes and materials of the first-stage and second-stage molded products 3, 17, or combinations thereof make it possible to easily adjust various properties of the resulting article, such as ball drop resilience, weight, buoyancy, and the like, increasing the degree of freedom for adjustment. Moreover, since the second-stage molding is conducted with the core A having been inserted in the center of the cavity, there is an advantage that no hollow space or cavity is formed in the center of the resulting spherical form.

SECOND EMBODIMENT

Next, a second embodiment of the invention will be described with reference to FIG. 4 to FIGS. 6a and 6b.

The second embodiment is distinguished from the first embodiment in that there is an additional step of filling up the holes 6 and 7 remaining in the plastic molded product 17 formed by the first embodiment. In these figures and the following description, parts and components identical or common to those in the first embodiment are designated by the same reference numerals, and detailed description thereof is omitted.

As described in the first embodiment, in the second-stage molding, the movable and fixed hold pins 4 and 5 are used for retaining the core A. In general, the hold pins 4 and 5 cannot withstand pressure applied during the molding unless they are thick enough to have a diameter of approximately 6 mm. Therefore, it is necessarily required to use such thick hold pins 4 and 5. As a result, the holes 6 and 7 formed by the hold pins 4 and 5 in the second-stage molded product 17 leave hollow space when the hold pins 4 and 5 are removed from the second-stage molded product 17. So long as the second-stage molded product 17 is not a spherical form or a ball for throwing (or flying) to a distant place, such as a baseball, the formed hollow space is not a matter to be minded, but if it is intended for such a mentioned spherical form, there arises an inconvenience that the gravitational force exerted on the spherical form having such hollow space is delicately or slightly put out of balance, which, if the central portion thereof is not well balanced, causes unstable movements of the spherical form or ball when it flies at a high speed.

To eliminate such a problem, the second embodiment is directed to a method of molding a plastic molded article 22 and a plastic molded article formed thereby, in which plastic pins 20 molded separately in advance are filled and secured into the holes 6 and 7 by utilizing frictional heat to fill up the holes, and then, unnecessary parts 21 of the plastic pins 20 are cut off to prevent the holes 6 and 7 from remaining as vacant space.

From a general point of view concerning the hole-filling processing, it is required to fill up the holes 6 and 7 by the use of a material which is similar in kind to that of the outer layer 16. However, in the case of a ball for a ball game, such as a baseball, the outer layer 16 is almost always formed of an expanded resin. Therefore, even if filling-up members are force-fit into the holes, only weak retaining force is created. Even if adhesives are used, they give very little effect on the outer layer 16 if it is formed of olefinic resins. Ultrasonic solvent welding is very difficult to conduct, since the rigidity of the outer layer 16 is very low, and mechanical vibration for the ultrasonic solvent welding is absorbed. Results of experiments clearly show that balls start to be broken from the portion of hole 6 or 7, and therefore, the solution of this problem has been demanded.

Under such circumstances, in the second embodiment, plastic pins 20 are molded in advance to the same size of the holes 6 and 7 with the same kind of material used for the outer layer 16, and a filling-up process is performed, which comprises the steps of holding one end of a pin 20 by a chuck 23 of a processing machine, such as a drilling machine, not shown, which has the function of rotating a workpiece, then setting the plastic molded product 17 in the processing machine just below the chuck 23 such that the holes 6 and 7 extend vertically, applying both rotational force and pressure at the same time to the pin 20 such that the pin 20 is driven via its front end 24 into the hole 6 or 7 while the pin 20 being rotated, to force-fit the pin 20 in the hole 6 or 7, thereby conducting pressure welding by frictional heat to effect fusion bond the pin 20 in the hole 6 or 7. In carrying out this process, it goes without saying that the holes 6 and 7, and the chuck 23 may be arranged to align in a horizontal direction.

The pin 20 for use in the present embodiment may have various shapes and constructions. FIG. 6a shows an example of the pin 20, which is constructed such that it has an embedding part 25 formed to a size corresponding to that of the holes 6 and 7, and a grip 26 for being held by a chuck, which has a diameter smaller than that of the embedding portion 25. FIG. 6b shows another, which is constructed such that it has embedding portions 27 on both sides, and a constricted part 28 having a diameter smaller than that of the embedding portions 27 and connecting the embedding portions 27. If the pin 20 is constructed as such, the pin 20 can be automatically cut off at such a reduced-diameter portion upon additional application of the weight of the plastic molded article 22 in the spherical form after the plastic pin has been secured by force-fit and pressure welding, which makes the machining operation very efficient.

According to the hole-filling step of the present embodiment, since both the rotational force and pressure are applied at the same time to the pin 20 to effect force-fitting and pressure welding by frictional heat of the pin 20 to fusion bond and secure the same into the holes 6 and 7 as described above, this improves the adherence of the pins 20 to the plastic molded product 22 to a very much higher extent than that attained by a simple force-fit or a method using an adhesive.

When the plastic molded article 22 is to be formed as a baseball, a final product may be that finished with the hole-filling working described above, or one which is obtained by covering a core of the hole-filled part with a skin of suitable material, not shown, such as oxhide or cowhide.

THIRD EMBODIMENT

Next, a third embodiment of the invention will be described with reference to FIG. 7.

In general, expanded articles are considered to be low in tearing strength. According to the third embodiment, resin fibers are included and dispersed in a plastic raw material before molding, whereby the resin fibers are uniformly dispersed within the plastic molded articles. This enables plastic molded articles with high tearing strength to be formed by molding.

Figure 7:
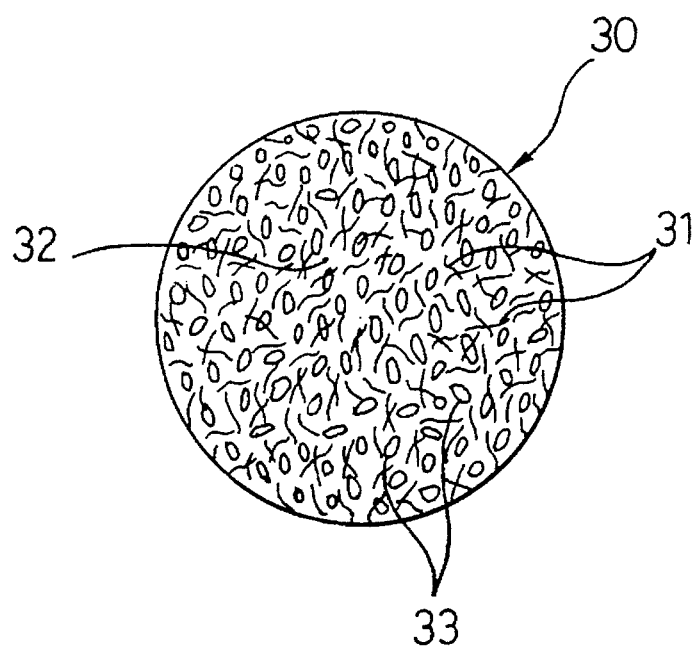
FIG. 7 is a cross-sectional view illustrating the state of a spherical form in which resin fibers are distributed all over.

FIG. 7 shows a second-stage molded product 30 in the spherical form for use as a baseball, which is made by mixing and dispersing resin fibers 31 in a plastic raw material 32 prior to the second-stage expansion molding. Reference numeral 33 designates holes produced by the second-stage expansion molding.

As the plastic raw material 32, there may be used for its base, a polyolefin resin containing vinyl acetate, e.g. EVAFLEX P-2526, trade name, manufactured by Mitsui Petrochemical Industries, Ltd. [ethylene-vinyl acetate copolymer resin manufactured by Mitsui-Dupont Polychemical Co., Ltd.].

The base may additionally include, as an impact modifier, a highly-adhesive polyolefin resin, with a trade name of MODIC, manufactured by Mitsubishi Petrochemical Co., Ltd., a TR resin by Asahi Chemical Industry Co., Ltd., an ionomer resin by Mitsui-Dupont Polychemical Co., Ltd. having a trade name of HI-MILAN, etc.

As a blowing material, there may be used azodicarbonamide, a zobisisobutyronitrile, etc., for instance FINEBLOW, trade name, manufactured by Mitsubishi Petrochemical Co., Ltd., and the like.

As the resin fibers mixed and dispersed in the plastic raw material 32, there may be used a molten liquid crystal polymer fiber having a trade name of VECTRAN, manufactured by Kuraray Co. Ltd. It is preferred that the fibers are in the form of monofilaments cut to a diameter of 0.0025 mm and a length of 5 to 8 mm.

Next, an example of experiment will be described.

| [Base of the plastic raw material] | |
|---|---|
| Ethylene-vinyl acetate copolymer resin available from Mitsui-Dupont Polychemical Co., Ltd. trade name: EVAFLEX P-2526 | 50 wt % |
| [Additive] | |
| Highly-adhesive polyolefin resin available from Mitsubishi Petrochemical Co., Ltd. trade name: MODIC | 10 wt % |
| TR resin available from Asahi Chemical Industry Co., Ltd. | 10 wt % |
| Ionomer resin available from Mitsui-Dupont Polychemical Co., Ltd. trade name: HI-MILAN | 30 wt % |

The plastic raw material having the above composition as 100% is mixed with the following blowing material and fiber:

| [Blowing material] | |
|---|---|
| Azodicarbonamide available from Mitsubishi Petrochemical Co., Ltd. trade name: FINEBLOW BX-64 | 6 wt % |
| [Fiber] | |
| Molten liquid crystal polymer fiber available from Kuraray Co. Ltd. trade name: VECTRAN monofilaments cut to a diameter of 0.0025 mm and a length of 5 to 8 mm | 5 wt % |

In the meantime, it is rather difficult to mix fibers with plastic materials, because the bulk specific gravity of long fibers is 20 times as large as that of pelletized plastic materials, so that it is almost impossible to mix themselves up. Additionally, most machines to be employed have extruders to which pelletizers are connected, and it has been meaningless to mix long fibers, since the plastic materials obtained after kneaded in the extruders are then cut into about 3 mm length.

Thus, in the present embodiment, previously-weighed plastic materials and fibers are directly and alternately supplied to a hopper as being the feed opening in the extruder for the materials, pressure is applied from the top for the plastic materials and fibers to be pushed into the extruder, then kneaded by means of a screw. The plastic materials extruded out from the extruder after kneaded with fibers are not designed to be introduced to the pelletizer. This method permits the production of an injection-molded article wherein fibers of 15 mm length are mixed by 15 wt %.

Then, a plastic molded article in a spherical form was formed by such a method as described in the first embodiment, which comprises a first-stage expansion molding step and a second-stage expansion molding step for molding an outer layer around a molded product, as a core, formed by the first-stage expansion molding. In the second-stage expansion molding step, the plastic raw material having the above composition and the blowing material were mixed with fibers to disperse the fibers therein in advance, and then the second-stage expansion molding was conducted to form the spherical plastic molded article.

The fibers made of a polyamide resin has a heat resistance high enough to withstand a temperature higher than 200° C. or its vicinity, a melting temperature of a polyethylene, by as much as 100° C., whereby it is possible to conduct the second-stage molding without the fibers being adversely affected by heat for the second-stage molding or by the blowing material.

Further, since the fibers are made of polyamide, the state of conjugation or joining thereof with the melt polyolefin resin is very excellent, and it has been found that if the fibers are added in an amount of about 5% under circumstance of the base, the finished molded article has a high strength.

Further, if fibers cut to a diameter of 0.0025 mm and a length of 5 to 8 mm are used in molding, the fibers are kneaded with the plastic raw material by rotation of a screw, not shown, of the second-stage molding machine to cause the fibers to be mixed with the whole of the plastic raw material in the molten state, so that when the second-stage molded product is cooled, the fibers are distributed uniformly all over the finished expansion-molded plastic article, without suffering from an unbalanced distribution of the fibers. The finished expansion-molded plastic article has been found to be a product possessing both softness and high tearing strength by the operation of an innumerable number of holes and fibers.

Figure 8:
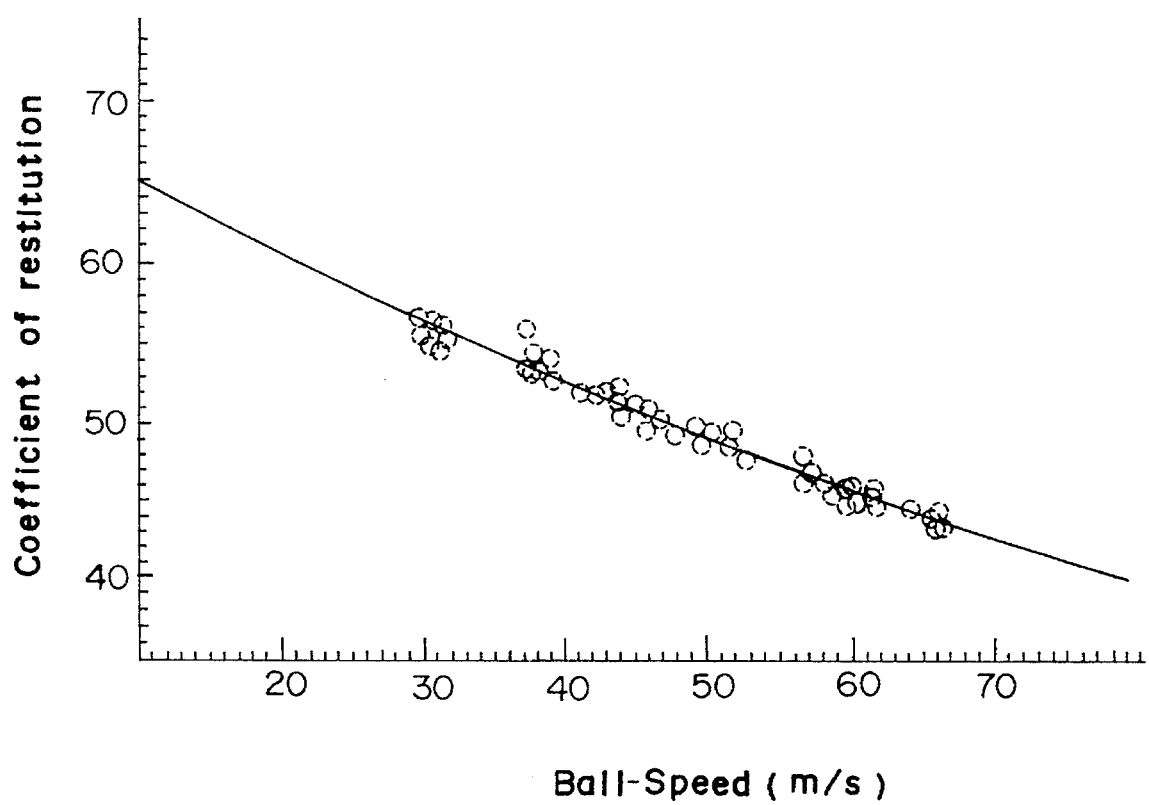
FIG. 8 is a diagram showing an exponential regression curve of measured coefficients of rebound of a ball.

The hole-filling working as described in the second embodiment was performed on the spherical form obtained by the above experiment, and the outside of the spherical form was covered with a cowhide which had been tanned to whiteness, followed by sewing the cowhide to obtain a baseball. The coefficient of rebound was measured to give an exponential regression curve as shown in FIG. 8. The coefficient of rebound of the baseball was found to be 0.413 to 0.437. The measuring conditions were as follows:

| Weight of baseball: | 229–235 g |
|---|---|
| Length of periphery: | 141.7–148.8 cm |
| Temperature at measurement: | 28° C. |
| Humidity at measurement: | 64% |

From the above, according to the third embodiment, if resin fibers are mixed, foams are connected with each other as if by threads, whereby it is possible to prevent the plastic molded product from weakening due to a sponge-like expansion, which results in an enlarged range of use of an expanded article. Moreover, by selecting a combination of the length of resin fibers, a rate of inclusion and dispersion, and a factor of expansion, there can be obtained expanded articles having various values of ball drop resilience. Further, owing to dispersed resin fibers included, even if a strong shock is applied thereto from the outside, the impact is transmitted in a spreading manner toward the periphery to be dispersed and thereby lost as frictional heat between the resin fibers and resin. Therefore, in actuality, the impact strength is increased. As a result, the expanded article made by the present embodiment can be suitable not only for baseballs but also for other balls, such as softballs and golf balls, and further for other plastic items, such as bumpers for automotive vehicles, helmets, and protectors. Since resins of low quality and low prices, such as polyolefins used as the base of plastic raw material can be transformed by inclusion and dispersion of resin fibers, into a resin having a high strength, it can be said that there can attain much economy in manufacturing the plastic molded articles according to the third embodiment of the invention.

What is claimed is:

1. A plastic molded article formed by expansion molding of a plastic raw material uniformly mixed with a blowing material, wherein said plastic molded article is formed by a two-stage expansion molding process comprising the steps of:

first-stage expansion molding of the uniformly mixed raw and blowing materials to form a core;

a second-stage expansion molding of a mixture of resin fibers dispersed randomly in said plastic raw material to produce an outer layer around said core such that outer layer is fusion bonded and integrated into one piece with a boundary region of said core, thereby forming a second-stage molded product.

2. The plastic molded article according to claim 1, wherein:

said core is formed with at least a pair of holes for engagement with hold pins for placing and retaining said core in a central position of a second-stage mold throughout said second-stage expansion molding, and with a balancing recess and projection.

3. The plastic molded article according to claim 2, wherein:

said core and said second-stage expansion molded product each comprise resin fibers which are mixed and dispersed within the plastic raw material and the blowing material before blowing thereof, to thereby cause said resin fibers to be uniformly distributed throughout said plastic molded article.

4. The plastic molded article according to claim 2, wherein:

said plastic raw material is prepared by adding to a base comprising an ethylene-vinyl acetate copolymer resin an impact modifier comprising one of a highly-adhesive polyolefin resin and an ionomer resin as an impact modifier.

5. The plastic molded article according to claim 2, wherein:

said plastic molded article has a spherical form for use as any one of a ball for hardball baseball, a ball for softball, and a ball for golf.

6. The plastic molded article according to claim 3, wherein:

said plastic raw material is prepared by adding to a base comprising an ethylene-vinyl acetate copolymer resin an impact modifier comprising one of a highly-adhesive polyolefin resin and an ionomer resin as an impact modifier.

7. The plastic molded article according to claim 3, wherein:

said plastic molded article has a spherical form for use as any one of a ball for hardball baseball, a ball for softball, and a ball for golf.

8. The plastic molded article according to claim 6, wherein:

said plastic molded article has a spherical form for use as any one of a ball for hardball baseball, a ball for softball, and a ball for golf.

9. The plastic molded article according to claim 4, wherein:

said plastic molded article has a spherical form for use as any one of a ball for hardball baseball, a ball for softball, and a ball for golf.

10. The plastic molded article according to claim 1, wherein:

said core and said second-stage expansion molded product each comprise resin fibers which are mixed and dispersed within the plastic raw material and the blowing material before blowing thereof, to thereby cause said resin fibers to be uniformly distributed throughout said plastic molded article.

11. The plastic molded article according to claim 10, wherein:

said plastic raw material is prepared by adding to a base comprising an ethylene-vinyl acetate copolymer resin an impact modifier comprising one of a highly-adhesive polyolefin resin and an ionomer resin as an impact modifier.

12. The plastic molded article according to claim 10, wherein:

said plastic molded article has a spherical form for use as any one of a ball for hardball baseball, a ball for softball, and a ball for golf.

13. The plastic molded article according to claim 11, wherein:

said plastic molded article has a spherical form for use as any one of a ball for hardball baseball, a ball for softball, and a ball for golf.

14. The plastic molded article according to claim 1, wherein:

said plastic raw material is prepared by adding to a base comprising an ethylene-vinyl acetate copolymer resin an impact modifier comprising one of a highly-adhesive polyolefin resin and an ionomer resin as an impact modifier.

15. The plastic molded article according to claim 14, wherein:

said plastic molded article has a spherical form for use as any one of a ball for hardball baseball, a ball for softball, and a ball for golf.

16. The plastic molded article according to claim 1, wherein:

said plastic molded article has a spherical form for use as any one of a ball for hardball baseball, a ball for softball, and a ball for golf.

17. A plastic molded article formed by expansion molding of a plastic raw material mixed uniformly with a blowing material, wherein said plastic molded article has resin fibers randomly pre-mixed and dispersed therein, before conducting said expansion molding, to thereby cause said resin fibers to be uniformly distributed throughout said plastic molded article when said expansion molding is completed, wherein said plastic raw material is prepared by adding to a base comprising an ethylene-vinyl acetate copolymer resin an impact modifier comprising one of a highly-adhesive polyolefin resin and an ionomer resin as an impact modifier.

18. A plastic molded article formed by expansion molding of a plastic raw material mixed uniformly with a blowing material, wherein said plastic molded article has resin fibers randomly pre-mixed and dispersed therein, before conducting said expansion molding, to thereby cause said resin fibers to be uniformly distributed throughout said plastic molded article when said expansion molding is completed, wherein said plastic molded article has a spherical form for use as any one of a ball for hardball baseball, a ball for softball, and a ball for golf.

19. A plastic molded article formed by expansion molding of a plastic raw material mixed uniformly with a blowing material, wherein said plastic molded article has resin fibers randomly pre-mixed and dispersed therein, before conducting said expansion molding, to thereby cause said resin fibers to be uniformly distributed throughout said plastic molded article when said expansion molding is completed, wherein said plastic raw material is prepared by adding to a base comprising an ethylene-vinyl acetate copolymer resin an impact modifier comprising one of a highly-adhesive polyolefin resin and an ionomer resin as an impact modifier, and wherein said plastic molded article has a spherical form for use as any one of a ball for hardball baseball, a ball for softball, and a ball for golf.

* * * * *